United States Patent
Bornfleth et al.

[11] 3,921,791
[45] Nov. 25, 1975

[54] CONVEYOR SYSTEM FOR SIDEWISE TRANSPORT OF CIGARETTES OR THE LIKE ALONG ARCUATE PATHS

[75] Inventors: Ulrich Bornfleth; Fritz Selonke, both of Hamburg, Germany

[73] Assignee: Hauni-Werke Korber & Co. KG, Hamburg, Germany

[22] Filed: June 26, 1973

[21] Appl. No.: 373,663

[30] Foreign Application Priority Data
July 5, 1972 Germany............................ 2232960

[52] U.S. Cl. ................................................. 198/165
[51] Int. Cl.²................... B65G 15/14; B65G 47/74
[58] Field of Search................... 198/163, 165, 167; 271/198, 265, 41

[56] References Cited
UNITED STATES PATENTS

| | | | |
|---|---|---|---|
| 2,539,524 | 1/1951 | Rixon.............................. | 198/165 |
| 2,776,528 | 1/1957 | Niederer et al................. | 198/165 X |
| 2,965,215 | 12/1960 | Molins............................ | 198/165 X |
| 3,074,533 | 1/1963 | Ninneman et al. ............. | 198/165 X |
| 3,124,231 | 3/1964 | Ott, Jr............................. | 198/165 X |
| 3,280,961 | 10/1966 | McCombie..................... | 198/165 X |
| 3,467,063 | 9/1969 | Brinkley et al. ................ | 198/165 X |
| 3,529,713 | 9/1970 | Poupin............................ | 198/165 |
| 3,712,455 | 1/1973 | Anfossi et al................... | 198/165 |
| 3,815,612 | 6/1974 | Molins............................ | 198/25 X |

FOREIGN PATENTS OR APPLICATIONS

| | | | |
|---|---|---|---|
| 508,541 | 9/1930 | Germany........................ | 198/165 |
| 1,244,079 | 9/1960 | France........................... | 198/165 |

*Primary Examiner*—Stanley H. Tollberg
*Assistant Examiner*—S. Hadd Lane
*Attorney, Agent, or Firm*—Michael S. Striker

[57] ABSTRACT

A conveyor system for sidewise transport of cigarettes or like rod-shaped smokers' products employs two transporting units each of which includes one or more endless conveyors. One of the transporting units may employ a single drum or two endless belts which are trained over a drum or over discrete rollers so that each includes an arcuate stretch located at one side of the path wherein the articles are to move sideways. The other transporting unit has two endless flexible elements having stretches which are spaced apart from and parallel to the periphery of the drum or to the aforementioned stretches of the endless belts. Each endless flexible element has an inner marginal portion which engages the articles in the path and an outer marginal portion which is guided by a suitable positioning device, such as the flange of a drum, so as to maintain the first marginal portion at a given distance from the stretches of the endless belts or from the peripheral surface of the drum forming part of the one transporting unit.

11 Claims, 6 Drawing Figures

CONVEYOR SYSTEM FOR SIDEWISE TRANSPORT OF CIGARETTES OR THE LIKE ALONG ARCUATE PATHS

BACKGROUND OF THE INVENTION

The present invention relates to improvements in conveyor systems or apparatus for sidewise transport of plain or filter tipped cigarettes, cigars, cigarillos, filter rod sections and/or analogous rod-shaped smokers' products in a production line or the like. More particularly, the invention relates to improvements in apparatus which are capable of transporting rod-shaped articles, especially readily deformable articles such as cigarettes, along elongated arcuate paths or along paths which include straight and arcuate portions.

Sidewise transport of rod-shaped smokers' products often presents serious problems. Such problems are aggravated due to the fact that the products are readily deformable and/or pressure-sensitive (for example, due to the tendency of the wrapper of a cigarette to open along the seam or due to the tendency of a filter plug which contains pulverulent filtering material to spill its contents in response to excessive deformation by externally applied mechanical forces.

In most instances, cigarettes or like rod-shaped articles are transported sideways by means of drums which are provided with axially parallel peripheral flutes and normally include means for retaining the articles in the respective flutes against the action of gravity and/or centrifugal force. Such retaining means may include shrouds or other mechanical retaining devices, or suction ports which are in permanent communication with the flutes and further communicate with a suitable suction generating device during certain stages of each revolution of the drum. A drawback of such drums is that they can receive rod-shaped articles only at regular intervals in dependency on the distance between neighboring flutes. Therefore, drums are used mainly in producing machines (such as filter cigarette making machines) to transport articles sideways past one or more testing stations where the articles are tested for the density of their tobacco-containing ends, their resistance to the passage of smoke therethrough, the presence or absence of leaks in the wrappers and/or for other defects. Reference may be had to U.S. Pat. No. 3,485,084. It is not customary, and often impossible, to employ drumshaped conveyors for sidewise transport of cigarettes or the like to certain destinations, for example, into a magazine wherein the articles are temporarily stored on their way from one or more producing machines to one or more consuming machines (e.g., packing machines for plain or filter tipped cigarettes or the like). A drum which is provided with flutes and is positioned to introduce cigarettes or the like directly into a magazine is likely to damage the articles which are already stored in the magazine. Moreover, suction drums are often too expensive for the transport of articles which should travel sideways but need not necessarily be equidistant from each other. This will be readily appreciated since, when the articles are to be transported at a high speed (e.g., from a filter cigarette making machine which can turn out up to and in excess of seventy articles per second), the articles must be attracted with a considerable force in order to avoid their ejection from the flutes under the action of gravity and especially due to centrifugal force. Therefore, such drums must be connected with large, bulky and expensive suction generating devices which consume large quantities of energy and produce considerable noise.

Shrouds or analogous fixed mechanical retaining means are equally unsatisfactory when the articles must be transported at a very high speed because they are likely to damage and/or deface the wrappers. Also, once an article is damaged, it is torn into shreds during travel past a stationary mechanical retaining device so that its contents contaminate the machine and can interfere with proper operation of the transporting apparatus, especially if the apparatus includes (in addition to mechanical retaining means) one or more devices employing tiny suction ports for retention of articles, webs of wrapping material and/or other components by suction.

Similar problems arise if the mechanical retaining means employs grippers, tongs or other openable retaining elements. Such elements must be opened and closed several thousand times per minute so that the wear on their parts is extremely high. Also, they produce considerable noise and must be actuated by costly, complex, bulky and sensitive equipment such as cams, electromagnets, gear trains or the like.

It was further proposed to transport cigarettes or the like sideways in random distribution (as concerns the spacing between neighboring articles) by means of endless conveyor belts. Belts exhibit the advantage that they can transport rod-shaped articles sideways along straight and/or arcuate paths. For example, certain manufacturers or processers of cigarettes or the like employ apparatus wherein one stretch of a first belt is trained over a drum or roller so that its outer surface assumes a convex shape. One stretch of another belt is adjacent to the convex stretch of the first belt and at least one of the stretches is yieldable so that rod-shaped articles can enter between the two stretches and can be engaged and transported sideways. A drawback of such apparatus is that successive increments of the stretch of the second belt cover different distances if the number of articles between the two stretches changes (the stretch of the second belt normally bears against the convex stretch of the first belt if no articles are located between the two stretches); this is undesirable because the second belt must be tensioned with a considerable force in order to insure that it does not slip off the rollers when the space between the two stretches is empty. The tensioning means is likely to deform or deface the articles, especially if the space between the two stretches contains a large number of articles so that the second belt is subjected to maximum tension. Moreover, as the number of articles between the two stretches varies, the second belt is likely to move lengthwise relative to the first belt which causes the articles in the gap between the two stretches to roll. Such rolling often results in excessive deformation and/or in partial or complete destruction of plain cigarettes or like sensitive smokers' products.

A conveyor system of the just described type is disclosed, for example, in U.S. Pat. Nos. 3,483,873 and 3,527,234 to Hinzmann.

SUMMARY OF THE INVENTION

An object of the invention is to provide a novel and improved apparatus for sidewise transport of rod-shaped articles, particularly for sidewise transport of rod-shaped smokers' products, which can transport articles along straight and/or arcuate paths, which can transport articles without any deformation and/or damage, which can be used for the transport of articles along relatively short as well as along relatively long paths, and whose article-engaging action is not dependent on the number of transported articles.

Another object of the invention is to provide an apparatus of the just outlined character which can transport articles sideways without any or with minimal changes in orientation, which can transport articles sideways at random mutual spacing, and which can also transport articles sideways at desired intervals, for example, in such a way that all articles which travel sideways are equidistant from each other.

A further object of the invention is to provide an apparatus which can transport rod-shaped articles upwardly or downwardly, along upwardly or downwardly curving paths, and whose action is just as satisfactory when the articles are being advanced at a high rate of speed as when the articles are caused to move at a relatively low speed.

An additional object of the invention is to provide a transporting apparatus for moving articles sideways along arcuate paths and/or along arcuate and straight paths which can be used in existing production lines or machines for the making of rod-shaped smokers' products as a superior substitute for presently known transporting apparatus.

Still another object of the invention is to provide an apparatus or conveyor system which can transport articles sideways through relatively short or relatively long distances and along straight and/or arcuate paths in such a way that the articles are subjected to less pronounced, more predictable and more accurately reproducible deforming stresses than in heretofore known apparatus.

An additional object of the invention is to provide an apparatus which is capable of properly transporting rod-shaped articles whose diameter is constant from end to end as well as filter cigarettes or analogous rod-shaped articles wherein the diameter of one end portion is normally larger than the diameter of the other end portion.

A further object of the invention is to provide a transporting apparatus which can properly transport rod-shaped articles of identical or different length, which can be used for the transport of articles whose diameters vary within a certain range, and which can properly transport filter cigarettes or analogous articles wherein the hardness of the tobacco-containing portion is less pronounced than the hardness of the portion which includes the filter tip.

The apparatus of the present invention is used to transport filter rod sections, plain or filter tipped cigarettes, cigars, cigarillos or analogous rod-shaped smokers' products having a predetermined diameter (which may fluctuate within a certain range such as in a filter cigarette or filter cigar). The apparatus comprises first transporting means including at least one first endless conveyor (such as a belt or a drum) which is arranged to move in a predetermined direction and has a first article-engaging and advancing surface located at a first side of an elongated path for sidewise movement of rod-shaped articles therealong, second transporting means which includes at least one second endless conveyor arranged to move in the predetermined direction and having a first endless portion (e.g., one marginal portion of an endless flexible element) provided with a second article-engaging and advancing surface located at a second side of the elongated path (which second side is located opposite the first side) and a second endless portion (e.g., the other marginal portion of an endless flexible element), and positioning means (such as a groove in a flange of a drum) for guiding the second portion of the second conveyor so that the distance between the first and second sides of the path in the absence of rod-shaped articles between the first and second article-engaging and transporting surfaces is only slightly less than or at most equals the predetermined diameter. Such guidance of the second conveyor insures that the first portion of the second conveyor engages the articles with a force which is not dependent on the number of articles in the path.

The elongated path may be curved or arcuate from end to end, or it may comprise one or more curved portions and one or more straight portions.

The novel features which are considered as characteristic of the invention are set forth in particular in the appended claims. The improved conveyor system itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
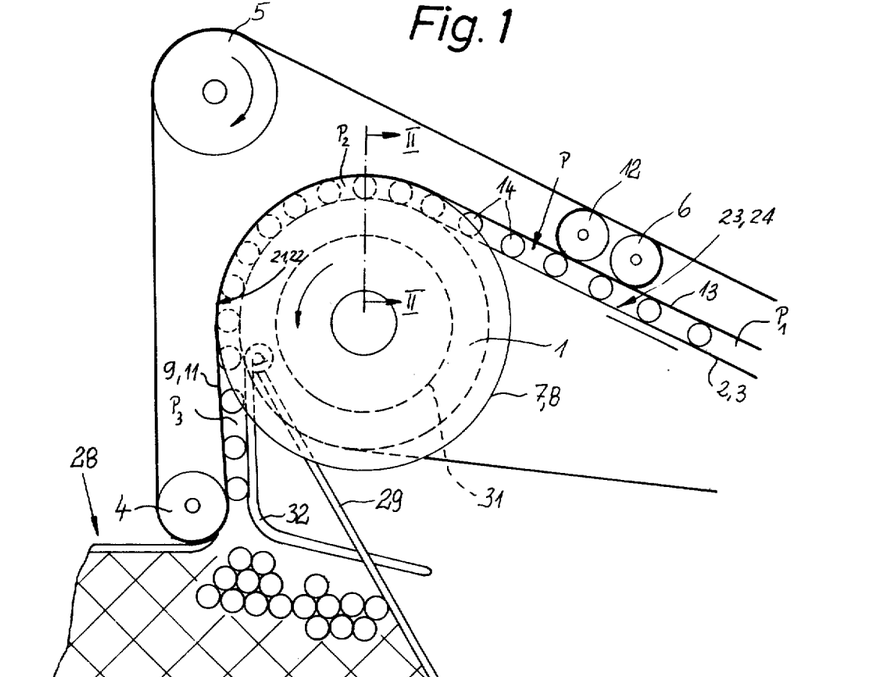
FIG. 1 is a fragmentary elevational view of a conveyor system which embodies one form of the invention.
Figure 2:
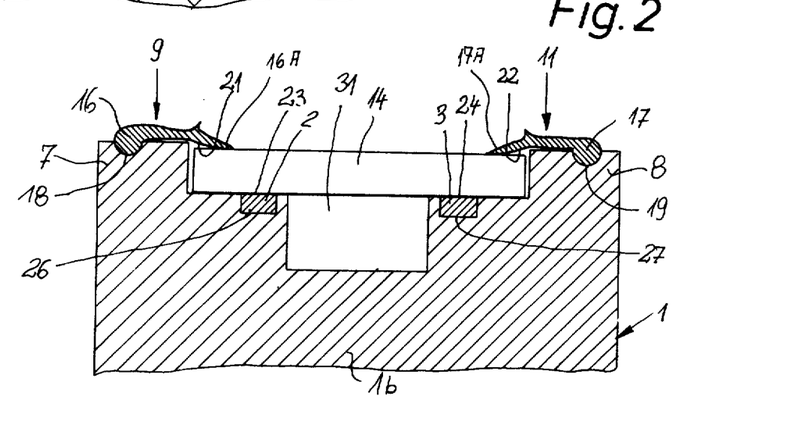
FIG. 2 is an enlarged fragmentary sectional view as seen in the direction of arrows from the line II—II of FIG. 1.

The conveyor system which is shown in FIGS. 1 and 2 constitutes an apparatus for sidewise transport of rod-shaped articles 14 (e.g., filter cigarettes of unit length) from a producer (such as a filter cigarette making machine, not shown) to a magazine or reservoir 28 of the type disclosed in the commonly owned copending application Ser. No. 369,954 filed June 14, 1973 by Bornfleth et al. for "Apparatus for temporary storage and transport of cigarettes or the like." The magazine 28 can store a variable supply of filter cigarettes to supply such cigarettes to a consumer (e.g., to a packing machine) when the producer is arrested or operates at less than full speed, or to store the output of the producer when the consumer is idle or operates at less than full speed.

The apparatus of FIGS. 1 and 2 comprises two transporting units each of which includes two endless conveyors. The two transporting units define an elongated path P having a straight portion P1 which is inclined upwardly from the outlet of the producer and an arcuate or curved portion P2. The articles 14 advance along the path P sideways and into the inlet of the magazine 28.

The first transporting unit comprises two endless belt conveyors having flat parallel belts 2, 3 which are trained over a number of rotary drum- or roller-shaped members including a drum 1 shown in FIG. 1 in the region where the straight portion P1 of the path P merges into the arcuate portion P2. The drum 1 is driven by a suitable prime mover, for example, in a manner as disclosed in the aforementioned copending application of Bornfleth et al. to which reference may be had if necessary. The prime mover rotates the drum 1 in a counter-clockwise direction, as viewed in FIG. 1, and the core 1b of the drum 1 is provided with two endless grooves 26, 27 for portions of the belts 2 and 3. These belts are respectively provided with article-engaging and advancing surfaces 23, 24 which are adjacent to one side of the path P between the outlet of the producer (lower end of the path portion P1) and close to the inlet of the magazine 28. The surfaces 23, 24 of the belts 2, 3 are located in a common plane which includes a flat portion extending along the underside of the path portion P1 and a convex portion extending along the core 1b of the drum 1.

The second transporting unit also includes two endless conveyors having endless flexible elements 9 and 11 which respectively include first or inner marginal portions 16A, 17A and second or outer marginal portions 16, 17. The outer marginal portions 16, 17 of the endless flexible elements 9, 11 and are provided with rounded beads extending into peripheral grooves 18, 19 provided in two coaxial flanges 7, 8 of the drum 1. These flanges together constitute a positioning device for guiding the portions 16, 17 of the conveyors 9, 11 in such a way that the distance between the two opposite sides of the elongated path P at most equals but may be somewhat less than the diameter of an article 14. The inner portions 16A, 17A of the endless flexible elements 9, 11 have article-engaging and advancing surfaces 21, 22 which are located at the other side of the path P, i.e., at that side which is located opposite the side at the surfaces 23, 24 of the belts 2, 3.

The flexible elements 9, 11 are trained over the flanges 7, 8 or positioning means of the drum 1, over pairs of or one-piece rollers 4, 5 and over at least one additional roller or pair of rollers 6. The rollers 5 are driven by the aforementioned prime mover for the drum 1.

If the rollers 6 are remote from the producer, i.e., from the lower end of the path portion P1, the apparatus may comprise a third pair of conveyors in the form of parallel endless bands 13 trained over one or two rollers 12. The end turns of the flexible elements 9, 11 in the region of the roller or rollers 6 may be disposed between the adjacent end turns of the belts 13, or vice versa.

It will be noted that, whereas the surfaces 23, 24 of the belts 2, 3 advance the articles 14 sideways all the way from the producer and close to the inlet of the magazine 28, the surfaces 21, 22 of the inner portions 16A, 17A of flexible elements 9, 11 engage the articles 14 only during travel from the roller or rollers 6 to the roller or rollers 4 which latter are immediately adjacent to the inlet of the magazine 28. The surfaces 21, 22 engage those articles 14 which are advanced from the outlet of the producer to the roller or rollers 6 by the belts 2, 3 in cooperation with the belts 13.

As mentioned before, the distance between the common plane of the surfaces 21, 22 on the inner portions 16A, 17A of flexible elements 9, 11 and the surfaces 23, 24 of the belts 2, 3 does not exceed the diameter of an article 14 regardless of whether the path P contains one or more articles 14 or does not contain any articles. The positioning means or flanges 7, 8 insure that the outer portions 16, 17 of the flexible elements 9, 11 are held in substantial parallelism with the adjacent portions of the belts 2, 3, i.e., the surfaces 21, 22 cannot move into actual contact with the surfaces 23, 24 or with the peripheral surface of the core 1b of the drum 1 even if the path P is empty. In other words, the distance between the bottom portions of the grooves 18, 19 and the peripheral surface of the core 1b is selected in such a way that the width of the path P (as measured from the side adjacent to the surfaces 23, 24 to the side adjacent to the surfaces 21, 22) does not change appreciably when the path P begins to receive articles 14 from the producer or when the producer ceases to supply articles into the path portion P1.

The material of the flexible elements 9, 11 may be rubber or an elastomeric synthetic plastic substance. However, it is not necessary that the flexible elements 9, 11 (or at least the inner portions 16A, 17A thereof) be made of an elastomeric material. The belts 2, 3 and 13 may be made of any suitable material, such as rubber reinforced with threads of metal or synthetic plastic, layers of textile material impregnated with a suitable resin, and/or others.

The magazine 28 is described in detail in the aforementioned copending application of Bornfleth et al. FIG. 1 merely shows an end wall 29 which can be pivoted clockwise in response to increasing volume of the magazine 28 to thereby trigger the movement of the other end wall (not shown) in a direction away from the roller or rollers 4 with resulting increase in the volume or capacity of the magazine. The upper end portion of the end wall 29 is articulately connected with a substantially L-shaped guide 32 which tends to assume the position of FIG. 1 by gravity so as to define with the adjacent portions of the flexible elements 9, 11 a channel P3 constituting a straight portion of the path P and serving to direct the articles 14 onto the topmost layer of articles in the magazine 4. The guide 32 reduces the likelihood of misalignment of articles 14 which descend in the path portion P3 with respect to articles which form the supply or stack of articles in the interior of the magazine 28. The upper end portion of the end wall 29 extends into a circumferential recess 31 provided in the peripheral surface of the core 1b between the grooves 26, 27 for the belts 2, 3 of the first transporting unit.

The operation is as follows:

When the producer turns out articles 14, its outlet delivers such articles sideways into the lower end of the path portion P1 between the belts 2, 3 and 13. The articles 14 are advanced sideways by the surfaces 23, 24 of the belts 2, 3 and by the lower surfaces of the belts 13. The surfaces 21, 22 of the inner portions 16A, 17A of the flexible elements 9, 11 take over from the surfaces of the belts 13 when the articles 14 reach the roller or rollers 6. From there on, the articles 14 are advanced by the surfaces 21, 22 and 23, 24 to move along the arcuate portion P2 of the path P and to enter the straight portion P3 between the surfaces 21, 22 and the guide 32 on the end wall 29. Successive articles 14 enter the magazine 28 from above and come to rest on the uppermost layer of articles in the interior of the magazine. It will be noted that the major portions of wrappers of the articles 14 are not contacted by any surfaces because they extend between the surfaces 21, 22 on the one hand and between the surfaces 23, 24 on the other hand. This insures a gentle treatment of articles 14 on their way into the magazine 28. The mounting of flexible elements 9, 11 is preferably such that the inner portions 16A, 17A (which resemble the lips of windshield wiper blades) bear against the adjacent end portions of the wrappers of articles 14 with a relatively small force which suffices to prevent ejection of articles 14 from the path portion P2 under the action of centrifugal force and which further insures that the articles 14 remain at least substantially parallel to each other during travel along the path P.

The guide 32 disengages the articles 14 from the surfaces 23, 24 of the belts 2, 3 and causes such articles to travel with the surfaces 21, 22 all the way to the roller or rollers 4, i.e., close to the uppermost layer of articles in the magazine 28. The height of the supply of articles in the magazine 28 changes very little or not at all because the other end wall (not shown) of the magazine is arranged to move toward or away from the end wall 29, depending on the number of articles in the magazine. This insures that the distance which successive articles 14 cover during gravitational movement from the roller or rollers 4 to the topmost layer of articles in the magazine 28 is sufficiently small to reduce the likelihood of even minor misalignment of unsupported articles.

The construction of the second transporting unit including the endless flexible elements 9 and 11 is of particular importance as regards the magnitude of the force with which the articles 14 are being held during travel along the path P, especially along the arcuate path portion P2. This will be readily appreciated since the articles 14 tend to leave the path portion P2 under the action of centrifugal force, especially if the conveyors of the apparatus shown in FIG. 1 are driven at a high speed. The flexibility of the inner portions 16A, 17A of the elements 9 and 11 is preferably high to thus further reduce the likelihood of undue deformation of articles 14 during transport along the path P. The portions 16A, 17A may exhibit a tendency to approach the surfaces 23, 24 of the belts 2, 3 when the path P is empty; however, the mounting of the outer portions 16, 17 is such that the distance between the surfaces 21, 22 on the one hand and the surfaces 23, 24 on the other hand does not decrease appreciably below the average diameter of an article 14, irrespective of whether the path P is empty, full or partially filled with articles. Thus, when the path P is empty, the distance between the surfaces 21, 23 and 22, 24 equals or is slightly less than the diameter of an article 14.

The width of the surfaces 21, 22 on the portions 16A, 17A of the endless flexible elements 9, 11 is preferably small. In accordance with a presently preferred embodiment, the configuration of the portions 16A, 17A can be selected in such a way that they come into what may be termed linear contact with the articles 14 in the path P. However, and since it is normally rather difficult to maintain a mere linear or point contact between a flexible elastic lip and the substantially tubular wrapper of a readily deformable cigarette or an analogous rod-shaped article wherein the wrapper surrounds a rod-like filler of yieldable fibrous material, it can be safely assumed that, as a rule, the articles 14 in the path P are in surface-to-surface contact with the portions 16A, 17A of the flexible elements 9 and 11.

Figure 3:
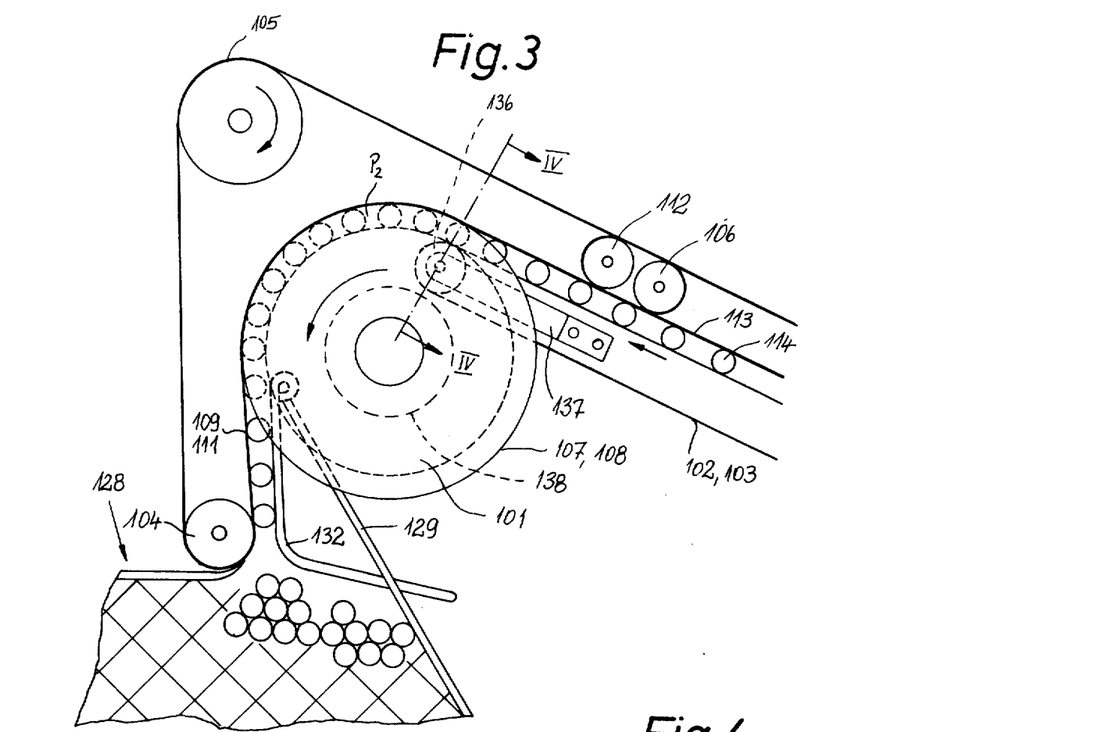
FIG. 3 is a fragmentary elevational view of a second conveyor system.
Figure 4:
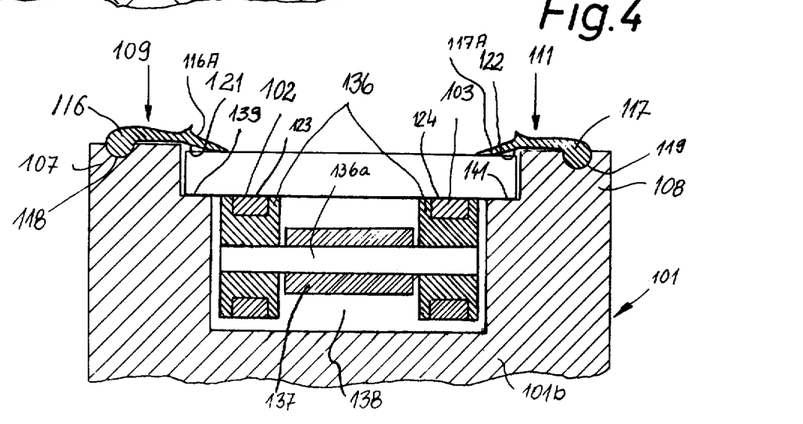
FIG. 4 is an enlarged fragmentary sectional view as seen in the direction of arrows from the line IV—IV of FIG. 3.

FIGS. 3 and 4 illustrate a portion of a second apparatus wherein all such parts which are identical with or clearly analogous to the corresponding parts of the first apparatus are denoted by similar reference characters plus 100. The main difference between the two apparatus is that the endless conveyer belts 102, 103 of the first transporting unit are not trained over the core of the drum but rather over two discrete rollers or drums 136 mounted on a shaft 136a which is rotatable in a stationary holder 137. The left-hand end portion of the holder 137 (as viewed in FIG. 3) with the rollers 136 thereon extends into the circumferential recess 138 of the core 101b of the drum 101. Thus, when the articles 114 reach the curved path portion P2, they are engaged and advanced by the surfaces 121, 122 of the inner portions or lips 116A, 117A of the endless flexible elements 109, 111 and by the convex surfaces 139, 141 forming part of the peripheral surface of the core 101b of the drum 101. In the region of the rollers 136, the surfaces 123, 124 of the belts 102, 103 are tangential to the respective surfaces 139, 141. The manner in which the belts 102, 103 cooperate with the belts 113 to advance the articles 114 from the producer of articles 114 into the range of surfaces 121, 122 in the region of the roller or rollers 106 and in which the pivotable guide 132 cooperates with the surfaces 121, 122 in the region of the roller or rollers 104 to advance the articles 114 into the magazine 128 is the same as described in connection with FIGS. 1 and 2.

In the embodiment of FIGS. 3 and 4, the first transporting unit includes the endless belts 102, 103 and the core 101b of the drum 101.

Figure 5:
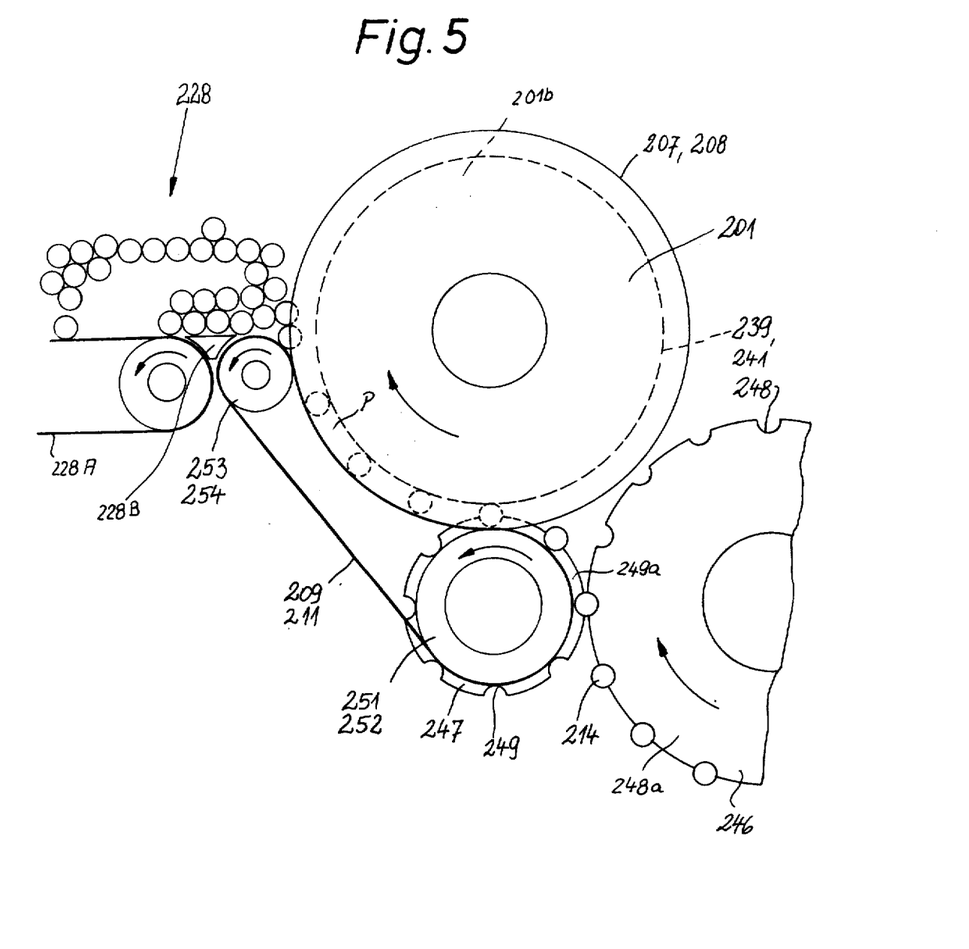
FIG. 5 is an elevational view of a third conveyor system.

FIG. 5 illustrates a third apparatus wherein the first transporting unit comprises a single endless conveyor in the form of a rotary drum 201 and the second transporting unit comprises two endless flexible elements 209, 211 corresponding to the flexible elements 9, 11 of FIGS. 1 and 2. The flanges 207, 208 of the drum 201 constitute a positioning means for the outer marginal portions of the flexible elements 209, 211, and the inner portions of the flexible elements 209, 211 cooperate with the article-engaging and advancing surfaces 239, 241 on the core 201b of the drum 201 in the same way as described for the surfaces 121, 122 and 139, 141 shown in FIG. 4. In FIG. 5, the entire path P along which the articles 214 advance between the surfaces 239, 241 and the surfaces of the inner portions of the flexible elements 209, 211 is of arcuate shape.

The flexible elements 209, 211 are trained over a first pair of rollers or drums 251, 252 at the inlet end of the path P and around a second pair of rollers or drums 253, 254 located at the inlet of a magazine or reservoir 228 having a mobile bottom wall or floor 228A. The articles 214 which advance beyond the rollers 253, 254 travel over a bridge member 228B to enter the magazine 228 from below. The flanges 207, 208 of the drum 201 constitute an end wall of the magazine 228. This magazine further comprises two side walls (not shown) which are parallel with the plane of FIG. 5. Similar side walls are provided in the magazine 28 or 128.

The means for feeding articles 214 sideways into the inlet or intake end of the arcuate path P comprises a drum-shaped feeder 246 which is provided with axially parallel peripheral receiving means or flutes 248 serving to insure that the articles 214 which travel with the feeder 246 remain equidistant from and parallel to each other. The feeder 246 can receive articles 214 from a filter cigarette making machine or another maker or producer, not shown.

The flutes 248 of the feeder 246 deliver articles 214 into successive receiving means or flutes 249 of a transfer drum 247 which is disposed between the rollers 251, 252 and serves to deliver articles 214 into the intake end of the arcuate path P.

The operation of the apparatus shown in FIG. 5 is analogous to that of the apparatus of FIGS. 3 and 4. Thus, once an article 214 enters the path P, it is engaged by the surfaces 239, 241 of the core 201b and by the surfaces of the inner portions of the flexible elements 209, 211 whereby the article continues to move sideways and enters the magazine 228 from below.

It will be noted that the path P of FIG. 5 is relatively short. The apparatus of FIG. 5 can be used with advantage for transfer of articles 214 from a fluted drum (246 or 247) into a magazine, for example, from a fluted drum which forms part of a filter cigarette making machine. Direct transfer of articles from the flutes of a drum into a magazine is normally undesirable because the ribs or lands between the flutes (see the ribs 248a and 249a of the drums 246, 247) are normally provided with relatively sharp edges which are likely to damage the articles in the interior of the magazine.

Figure 6:
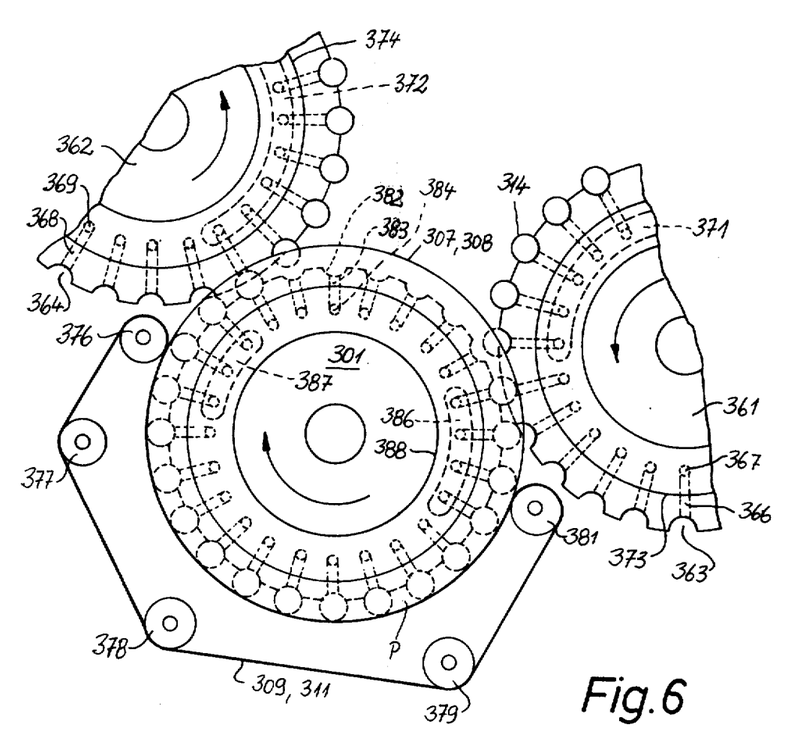
FIG. 6 is an elevational view of a fourth conveyor system.

The apparatus of FIG. 6 is similar to the apparatus of FIG. 5; therefore, all such parts of the structure shown in FIG. 6 which are identical with or clearly analogous to the corresponding parts of FIG. 5 denoted by similar reference characters plus 100. The difference is that the drums 361, 301, 362 are provided with retaining means for attracting the articles 314 by suction so that the articles remain equidistant from each other during transport into a magazine, not shown, or to another destination.

The drum 361 constitutes a feeder of articles 314 into the arcuate path P and is provided with axially parallel peripheral receiving means or flutes 363 communicating with radially inwardly extending suction ports 366 which attract the articles 314 in the respective flutes during travel with the drum 361. Each flute 363 can communicate with one, two or more radial suction ports 366. The flutes 363 extend in parallelism with blind bores or channels 367 which communicate with the respective ports 366 and have open ends at the front axial end of the drum 361, as viewed in FIG. 6. This front axial end of the drum 361 rotates adjacent to a stationary valve plate 373 having an arcuate groove 371 which is connected with a suction generating device such as a fan or blower, not shown. Those channels 367 which communicate with the groove 371 cause the respective suction ports 366 to attract articles 314 in the corresponding flutes 363. It will be noted that the suction groove 371 terminates upstream of the inlet end of the arcuate path P between the endless flexible elements 309, 311 of the second transporting unit and the article-engaging and advancing surfaces flanking the flutes 382 in the peripheral surface of the core of the drum 301. The flutes 382 communicate with radially inwardly extending suction ports 383 which, in turn, communicate with axially parallel channels 384 of the drum 301. The open ends of the channels 384 are located at the front axial end of the drum 301, as viewed in FIG. 6, which front axial end rotates adjacent to a stationary valve plate 388 having two arcuate suction grooves 386 and 387 respectively adjacent to the inlet and discharge ends of the path P. The grooves 386, 387 are connected with the aforementioned suction generating device so that the ports 383 attract the articles 314 during travel along the groove 386 as well as during travel along the groove 387. This insures a reliable transfer of articles 314 from the flutes 363 of the drum 361 into the flutes 382 and again from the flutes 382 into the flutes 364 of the drum 362. The latter is similar to the drum 361, i.e., it also comprises radial suction ports 368 and axially parallel suctional channels 369 and cooperates with a valve plate 374 having an arcuate groove 372 connected with the suction generating device. The ports 368 which travel along the groove 372 attract the articles 314 in those flutes 364 which travel beyond the groove 387 of the valve plate 388.

The drum 301 is provided with positioning means or flanges 307, 308 for the outer marginal portions of the flexible elements 309, 311 which are preferably similar to the flexible elements 9, 11 of FIGS. 1 and 2. The flexible elements 309, 311 are further trained over discrete rollers or pairs of rollers 376, 377, 378, 379 and 381. The drums 301, 361, 362 are driven in directions indicated by arrows so that their flutes 363, 382, 364 travel sideways at identical speeds.

The operation of the apparatus of FIG. 6 is as follows:

A producer or another source (not shown) admits articles 314 into successive flutes 363 of the feeder drum 361 at a transfer station located to the right of the illustrated portion of the drum 361, and such articles are attracted by the respective ports 366 which travel along the groove 371 of the valve plate 373. When the articles 314 reach the 9 o'clock position, as viewed in FIG. 6, the corresponding flutes 363 and ports 366 advance beyond the groove 371 so that the articles are automatically transferred into the adjacent flutes 382 of the drum 301 because the corresponding ports 383 then communicate with the groove 386 of the valve plate 388. The articles 314 thereupon enter the arcuate path P and are held without suction due to simultaneous engagement of their wrappers by the surfaces of the flexible elements 309, 311 and by the surfaces surrounding the respective flutes 382. The articles 314 are again attracted by suction when they reach the discharge end of the path P because the corresponding ports 383 then communicate with the groove 387 of the valve plate 388. Each article 314 which moves beyond the groove 387 is automatically transferred into a flute 364 of the drum 362 because the corresponding suction port 368 then communicates with the groove 372 of the valve plate 374. The drum 362 of FIG. 6 may correspond to the drumshaped feeder 246 of FIG. 5. Though not specifically shown in FIG. 5, the apparatus which embodies the drum 246 is evidently provided with some retaining means which insures that the articles 214 cannot leave the flutes 248 by gravity or under the action of centrifugal force during travel toward the flutes 249 of the transfer drum 247. Such retaining means can include conventional arcuate shrouds or a pneumatic retaining system of the type shown in FIG. 6.

An important advantage of the improved apparatus is that it can transport sensitive articles, such as plain or filter tipped cigarettes, cigars or cigarillos and/or filter rod sections, without lasting deformation of the articles, without contamination of the articles, at a high speed and in a desired orientation irrespective of whether the articles must be advanced along straight or arcuate or curved portions of an elongated path. The location of the positioning means for the conveyor or conveyors of the second transporting unit relative to the conveyor or conveyors of the first transporting unit can be readily selected with a view to insure that the articles are held with a minimal force which is just sufficient to hold the articles against slippage, shifting and/or other stray movements while insuring that the articles cannot undergo permanent deformation, even if the path P is very long. Moreover, the apparatus can be designed to transport articles in random spacing from each other (see, for example, FIG. 1) or in such a way that the neighboring articles are held at a predetermined distance from each other (see FIG. 5 and particularly FIG. 6).

It is further clear that the improved apparatus is susceptible of many additional modifications. For example, one of the flexible elements of the second transporting unit can be omitted or the flexible elements can be mounted in such a way that one thereof engages each adjacent article close to one end of the article whereas the other flexible element engages the respective article substantially midway between its ends.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. Apparatus for transport of cigarettes or analogous rod-shaped articles having a predetermined diameter, comprising first transporting means including a first endless conveyor arranged to move in a predetermined direction and having at least one first article-engaging and advancing surface located at a first side of an elongated path for sidewise movement of rod-shaped articles therealong; second transporting means including a second endless conveyor arranged to move in said predetermined direction and comprising an endless flexible element having an elastic first endless marginal portion provided with a second article-engaging and advancing surface located at a second side of said path opposite said first side and a second endless marginal portion, at least a portion of said path being curved and one of said surfaces being convex in the region of said curved portion of said path, the other of said surfaces being concave in the region of said curved portion of said path; and positioning means for guiding said second marginal portion of said flexible element so that the distance between said first and second sides of said path in the absence of articles between said surfaces is not appreciably less than and at most equals said predetermined diameter, said elastic first marginal portion of said flexible element biasing the articles in said path against said first surface.

2. Apparatus as defined in claim 1, wherein said first conveyor is a rotary drum-shaped member having an annular portion constituting said positioning means.

3. Apparatus as defined in claim 1, wherein at least one of said conveyors has equidistant receiving means for portions of articles which advance sideways along said path.

4. Apparatus as defined in claim 3, wherein said first conveyor comprises a rotary drum-shaped member and said receiving means are axially parallel flutes provided on said drum-shaped member.

5. Apparatus as defined in claim 1, further comprising retaining means for attracting the articles to one of said conveyors by suction.

6. Apparatus as defined in claim 5, wherein said first conveyor comprises a rotary drum-shaped member having axially parallel equidistant flutes which receive portions of rod-shaped articles during travel of articles along said path, and retaining means comprising suction ports provided in said drum-shaped member and communicating with said flutes.

7. Apparatus as defined in claim 1, wherein said second marginal portion of said flexible element comprises an endless bead and said positioning means comprises a groove for said bead.

8. Apparatus as defined in claim 1, wherein said elongated path includes straight and curved portions.

9. Apparatus as defined in claim 1, wherein said second transporting means further comprises an additional second endless conveyor including an additional endless flexible element having an elastic first endless marginal portion with an additional article-engaging and advancing second surface and a second endless marginal portion, and further comprising additional positioning means for guiding the second marginal portion of said additional flexible element.

10. Apparatus as defined in claim 1, wherein said positioning means includes a rotary drum-shaped member and said second marginal portion of said flexible element is trained over said drum-shaped member.

11. Apparatus as defined in claim 10, wherein said drum-shaped member has a flange arranged to guide said second marginal portion of said flexible element.

* * * * *